March 4, 1969  R. J. G. CRAIG  3,430,499
FREE ROTATING GYRO ALIGNMENT APPARATUS
Filed Oct. 20, 1965

Robert J. G. Craig,
INVENTOR.
BY.

Golove & Kleinberg,
ATTORNEYS.

March 4, 1969  R. J. G. CRAIG  3,430,499
FREE ROTATING GYRO ALIGNMENT APPARATUS
Filed Oct. 20, 1965  Sheet 2 of 3

Robert J. G. Craig,
INVENTOR.
BY.

Golove & Kleinberg,
ATTORNEYS.

Robert J. G. Craig,
INVENTOR.
BY.

Golove & Kleinberg,
ATTORNEYS.

United States Patent Office 3,430,499
Patented Mar. 4, 1969

3,430,499
FREE ROTATING GYRO ALIGNMENT APPARATUS
Robert J. G. Craig, Malibu, Calif., assignor to Teledyne Systems, Inc., Hawthorne, Calif.
Filed Oct. 20, 1965, Ser. No. 498,271
U.S. Cl. 74—5.1                    5 Claims
Int. Cl. G01c 19/24

ABSTRACT OF THE DISCLOSURE

An alignment system for use with free rotating, fluid supported gyros employs a pin coincident with a predetermined alignment axis, which is selectively energized in response to applied signals. Appropriate take offs sense deviation of the rotational axis of the alignment axis, in response to which the rotor can be realigned.

---

The present invention relates to a method and apparatus for realigning and/or caging a fluid bearing gyroscope, of a type useful in inertial navigation systems.

Fluid supported gyroscopes are well known in the prior art and several have been disclosed which are wholly supported by the fluid and which are driven by turbine action of fluid jets upon suitable vanes on the rotor member. Alternatively, other rotors have been disclosed in which the fluid has been supplied to the interior of the rotor and thence through nozzles at the surface, imparting a jet action which causes rotation. For most free floating gyros, erecting and caging functions have been accomplished by applying suitable torques or forces to the stationary structures rather than to the rotor itself.

Other forms of gyroscopes have bearings supporting the spin axis. One such device is disclosed in the patent to T. O. Summers, Jr., No. 2,412,481, issued Dec. 10, 1946. A structure is shown which incorporates a dome shaped head, extending from the rotor axis. The outer surface of the dome has the form of a spherical zone of one base (also referred to as a spherical arc), the center of which is positioned at the intersection of the major and minor gimbal axes. The dome is mounted for rotation with the rotor.

A spring mounted caging pin is adapted to fit into a recess in the dome which, when engaged, cages the gyroscope. During start up, the pin in the recess maintains the spin axis in the vertical. With the gyro free running, the friction pin is maintained out of engagement with the sphere, and is only used to cage the gyro. The friction pin, which is fastened to the stationary system, is released and contacts the surface of the dome, whose spin axis at all times is coincidental with the rotor spin axis. The recess must therefore be coaxial with the spin axis and must be absolutely symmetrical about the axis. The point of engagement lies in a radius of the dome which extends in the direction of displacement of the spin axis.

The friction developed by engagement of the pin and the extent to which the pin is not symmetrical about the spin axis results in forces against the dome in a direction perpendicular to that displacement. Since that force is offset from the axes of the gimbal support of the gyroscope, it manifests itself as an erecting torque perpendicular to the displacements which have preceded the engagement of the pin with the dome. As a consequence, the gyroscope is caused to precess in its gimbals in a direction which brings the recess into registry with the pin, and the pin enters the recess, further locking the gyro in predetermined alignment with the stationary frame.

When such a gyro is started from the caged position, either the pin can be withdrawn and the rotor energized, or, alternatively, the rotor can be energized with the pin in place and, when the rotor is up to speed, the pin can be withdrawn.

Yet other patents to T. O. Summers, Jr., U.S. Patent Nos. 2,635,469, 2,722,126, 2,722,127 and 2,828,629, teach the provision of an erecting or caging device, including a friction button adapted to apply a continuous, constant aligning force to a spinning spherical surface. However, these patents all teach that the force is to be uninterruptedly applied to maintain the gyro vertical aligned with the gravity vector although means are provided to release the friction button during turning or other maneuvers of the vehicle in which the gyro is installed.

The gyros to which these patents are applicable are of the bearing type having gimbal axes and desired orientations with respect to local gravity.

The principles disclosed therein are not readily applicable to relatively free, rotating gyros which are supported by fluid bearings or which are designed to operate in predetermined alignments which may be independent of any gravitational field.

In modern, free floating, wholly fluid supported navigational gyroscopes, the need for physical "caging" or permanent alignment to a "vertical" rarely arises during normal operation. However, it is frequently necessary to periodically realign the gyroscope to a desired spin axis after a predetermined amount of drift, or, alternatively, in the case of an inertial guidance system, to utilize the fact of axis rotation to provide navigational information to the system.

In an incremental system, a predetermined increment of axis displacement is permitted before the gyro is realigned to the local vertical. Each realignment operation can be utilized in a data processing system, to recognize a change in gyro orientation by the predetermined increment. If several gyros are used, each aligned to a different (orthogonal) axis, the instantaneous orientation of the system can be computed at all times. In addition, a friction alignment system is useful to maintain the spin axis of the rotor coincident with the predetermined axis of the instrument system.

A problem existing with friction peg caging mechanisms, which utilizes a caging recess in the rotor, generally, is that a "kick" or violent reaction results when a caging pin is withdrawn from a caging recess. Production techniques have not reached that stage where a hole can be drilled, the center of which is identically coincident with the axis of rotation. If any changes in orientation occur, an oscillation is built up around the pin with the sides of the opening contacting the pin. On the withdrawal of the caging pin, a "kick" is imparted to the gyroscope rotor which is unpredictable, both in direction and magnitude, and which cannot be directly corrected for.

In the case of frictional erecting devices which employ a frictional pin bearing against the rotor, a continuous axial force is applied, which, in the case of gimballed gyros can usually be accommodated without detrimental effect. However, in the case of fluid supported gyros, the continuous provision of a force along the spin axis, creates a force imbalance for which compensating forces are not readily available.

Further, when using fluid supported gyros in navigational systems, the gyro is rarely required to be aligned with the vehicle but rather serves as a relatively independent reference with respect to an external inertial reference system. Therefore, the alignment of the spin axis relative to the orientation axis represents critical navigational information and any continuous caging operation would cause this information to be lost.

For the purpose of the present invention and the following discussion, the term "caging" will be used to mean the realignment of the spin axis of any rotationally unrestrained rotating body with a predetermined, desired axis. The term "erection" will not be used in the following discussion, since that term is generally used to indicate an initial alignment of the vertical of the gyroscope with a local vertical. The term "fluid" as used herein, should be construed to include both gaseous and liquid fluids and, therefore, encompasses both "hydraulic" and "pneumatic" systems.

The present invention contemplates the use of a fluid supported rotor which is not supported by restraining bearings either along its axis of rotation or gimbal axes. Rather, the rotor is relatively free to move its axis of rotation supported only by fluid bearings. It must be understood, of course, that the present invention is also useful with restrained rotors that have a limited amount of freedom for the motion of the spin axis.

However, even structures such as are taught in the prior art, may adopt a system similar to that taught in the present invention and accordingly, the scope of the invention must be considered broad enough to include such devices in navigational systems, modified in accordance with the teachings of the present invention.

According to a preferred embodiment of the present invention, there is provided a system for inertial guidance in which the gyro is "caged" or reoriented after an incremental amount of axial change. In systems with three, similar gyros, the incremental change along each alignment axis can be recorded and stored, and can provide an input to suitable computation devices for determining orientation of the gyros at any time.

The system includes the provision of electrical pickoffs which cooperate with corresponding indexing elements on the rotor. When a shift in the position of the indexing elements is "detected" by the pickoffs, an impulse is generated which drives an alignment pin or peg. The driving impulse is recorded and stored as indicative of an increment of axial shaft.

For example, if each 30° change of the orientation axis from alignment with the spin axis is signaled and corrected for, after twelve successive actuations, corresponding to continuous turning in the same plane, a suitable computation device will indicate a complete 360° turn. Clearly, in such an embodiment, a "free" rotor gyro can be utilized in any system requiring gyros, and may be used in conjunction with stable platforms.

In yet other embodiments, the aligning of a relatively free gyro can be accomplished repeatedly, and at will, without the need for locking the gimbals or otherwise disabling the gyro during alignment. Thus, very few rotations of the rotor are required for alignment of the axes, which can be accomplished in an extremely brief time interval.

The friction pin or peg can be electrically hydraulically or pneumatically actuated. If electrical actuation is used, the actuating signals can be directly usable to indicate increments of axial misalignment.

Accordingly, it is an object of the invention to provide an improved means for caging a free rotor type gproscope.

It is yet another object of the invention to provide means for aligning the rotational axis of a gyroscopic rotor with a predetermined, desired axis.

It is yet another object of the invention to provide caging means for a relatively unrestrained rotatable gyroscopic mass.

It is a further object of the invention to provide caging means, operable in response to signals representing a predetermined incremental deviation of the spin axis from a desired axis.

It is a still additional object of the invention to provide improved caging means for a rotatable gyroscopic body which are selectively actuable to align the rotational axis with a desired, predetermined axis, without reaction torques.

It is yet an additional object to provide an electrically actuable frictional pin member for aligning the spin axis of a gyroscopic body with a predetermined desired axis.

It is yet an additional object of the invention to provide a hydraulically actuated frictional pin for aligning the axis of rotation of a gyroscopic mass with a predetermined desired axis.

It is still an additional object of the invention to provide a pneumatically operated aligning means including a frictional pin for aligning the axis of rotation of a gyroscopic mass with a predetermined desired axis.

It is a still further object of the invention to provide a system for inertial guidance in which a predetermined incremental drift of the axis rotation of a gyroscopic mass from a desired predetermined axis, is signaled, and the rotational axis is aligned with the desired axis, providing an input to a computer, representing the incremental realignment of the rotational axis.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

Figure 1:
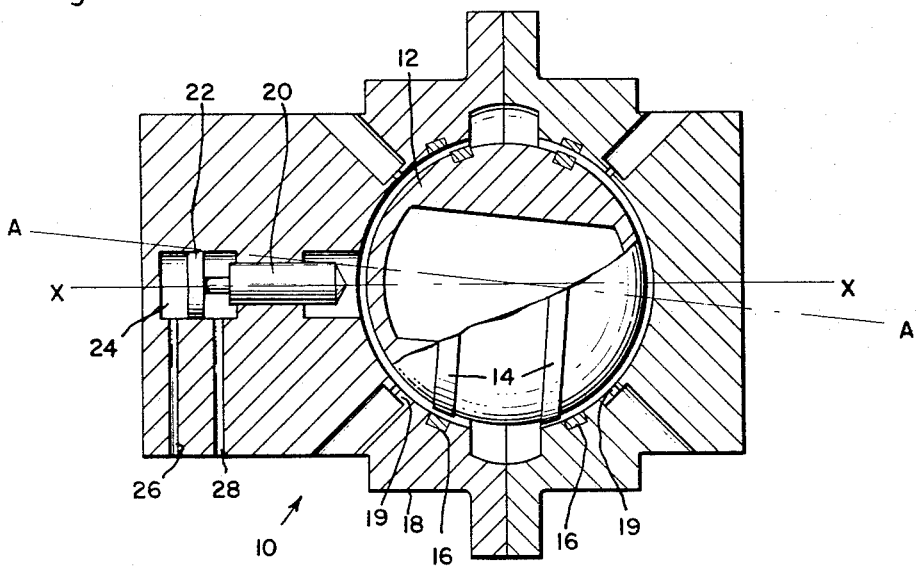
FIG. 1 is a side sectional view of the free-rotor gyroscope, including a selectively actuable caging pin according to the present invention.

Turning first to FIG. 1, there is shown a fluid supported gyroscope 10 which includes a freely rotating ball rotor member 12. Embedded in the surface of the rotor ball 12, in a circle parallel to the equator, are a pair of conductive rings 14. The ball member is otherwise made up of a non-conductor.

In combination with the conductive rings 14 are stationary capacitative pickoffs 16, which are embedded in a housing 18, and are normally positioned to be adjacent to the rings when the rotational axis of the rotor 12 coincides with the predetermined axis of the gyroscope 10. As seen in the view of FIG. 1, the rotor is substantially a hollow sphere with a major axis of inertia along the line AA. It is desired that axis of rotation and the axis of alignment for the gyro housing 18 be along the line XX.

The desired operation normally contemplates that the axes AA and XX coincide, and that any deviation therefrom has resulted from a change in orientation of the housing 18 rather than the rotor 12. The housing 18 includes a plurality of hydrodynamic or fluid support pads 19 which sustain and support the rotor 12 and maintain it out of contact with the walls of the housing 18. Also, there are provided thrust nozzles and/or vanes to permit continued rotation of the rotor 12 to be a function of applied hydrodynamic fluid pressure.

Located in the housing 18 and aligned to be coaxial and concentric with the alignment axis XX, is a frictional peg 20 that is adapted to contact the surface of the rotor ball 12. In the embodiment of FIG. 1, a hydraulic piston and chamber 22, 24 is shown within a pair of fluid supply lines 26, 28, for energizing and de-energizing the pin 20, respectively.

Suitable valving is provided to alternatively connect the ports to a source of fluid under pressure and to a fluid source at a different pressure (not shown). It is then possible, in the event of a drift of the rotational axis AA with respect to the desired axis XX during any operating period, that the axes can be continually realigned to coincide with each other by frictional caging of the rotor. As is well known, the frictional torques created cause the rotational axis AA to shift until the point of contact meets the alignment axis XX.

Figure 2:
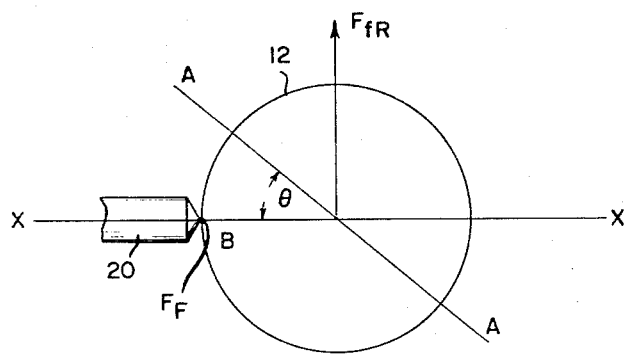
FIG. 2 is a diagram illustrating the operating principles involved in the present invention.

Turning now to FIG. 2, there is shown in diagrammatic form, the rotor 12 and the frictional caging pin 20. When the pin 20 makes physical contact with the rotor 12, which is spinning on the rotational axis AA, the frictional force $F_F$ created can be represented by a vector perpendicular to the plane of the drawing at the point of contact. A torque vector $F_{fR}$ is orthogonal to this vector in the plane of the drawing. The component of the torque vector that is perpendicular to the spin axis AA is $F_{fR} \cos \theta$ which is responsible for the precession of the spin axis AA to coincide with the orientation axis XX. The physical principle is generally taught in the above-mentioned patents to T. O. Summers, Jr.

In normal operation, the time during which the pin 20 engages the rotor 12 need only be that required for a few revolutions of the rotor 12. Therefore, if periodic realignment only is desired, a suitable timing circuit (not shown) can control a periodic energization of the fluid or electrical circuits that drive the pin 20. The circuits remain energized for a limited time interval, calculated to be sufficient in duration to align the axes from the maximum expected deviation. Alternatively, pickoffs may be provided which generate a feedback signal when the axes are in alignment, which feedback signal can be used to deenergize the pin driving circuits.

Figure 3:
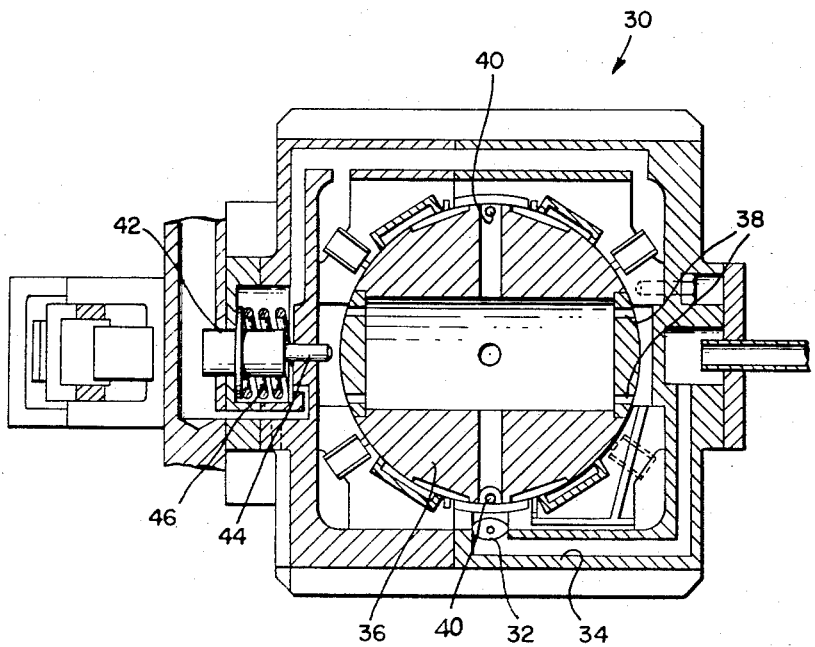
FIG. 3 is a side sectional view of an alternative free-rotor gyroscope including a frictional caging pin according to the present invention.

In FIG. 3, there is shown an alternative embodiment of a gyro 30 including a frictional caging pin according to the present invention. In this embodiment, a plurality of nozzles 32 positioned in the housing 34 drive a ball rotor 36 up to speed.

As seen in FIG. 3, suitable fluid supply conduits 38 are provided to the interior of the rotor 36 so that speed sustaining nozzles 40, carried by the rotor 36, can be utilized to maintain rotational velocity.

A solenoid 42 is used to drive a frictional caging pin 44 and a spring member 46 is used to maintain the pin 44 normally out of engagement. When the solenoid 42 is energized, the pin 44 is urged against the rotor 36 for alignment of the rotor axis with respect to the instrument axis.

Figure 4:
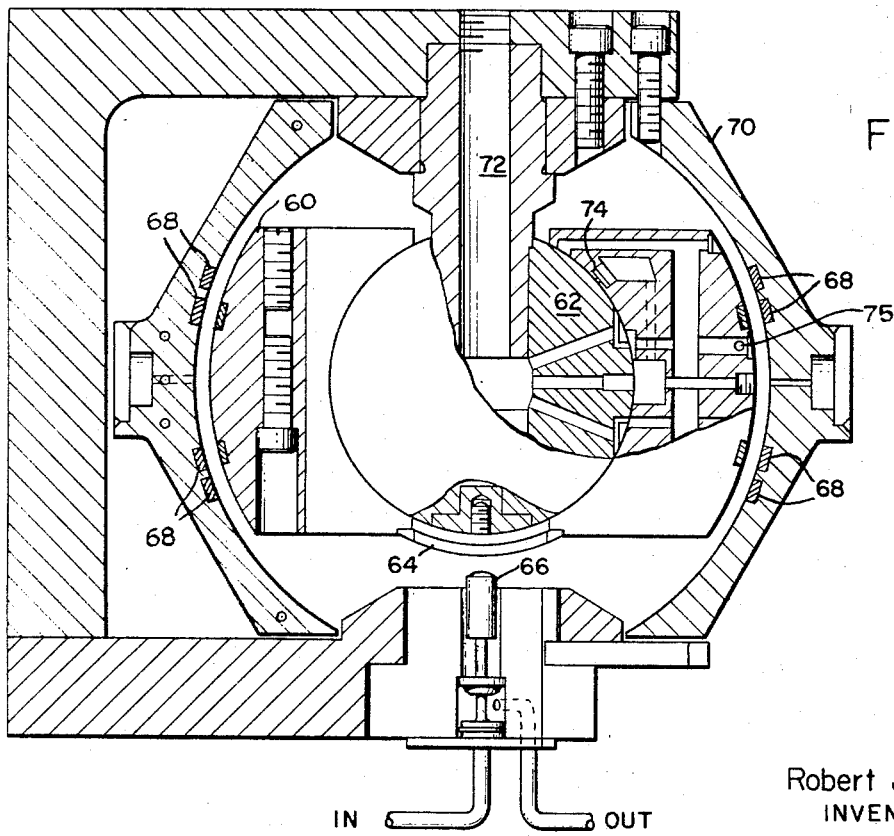
FIG. 4 is a side sectional view of yet another embodiment of the present invention utilizing a rotational spherical zone as the rotor element in combination with a frictional erecting pin according to the present invention.

In yet another embodiment, shown in FIG. 4, the rotor member 60 is a spherical zone mounted on a "ball" shaped core 62, similar to the gimbal and support bearings taught in the prior patents to Leslie F. Carter, Nos. 2,086,895, 2,086,897, 2,091,964 and 2,142,018. In this embodiment the rotor 60 is provided with a spherical segment 64 which resembles a "polar cap" and which is operable in conjunction with a frictional caging pin 66 herein shown to be hydraulically actuated through use of a suitable piston and chamber.

As in the other embodiment, pick offs 68 are provided in the housing 70. When an incremental amount of axial displacement is signaled by the pickoffs 68, the friction pin 66 is energized. It will be noted that in the embodiment of FIG. 4, the spin axis of rotor 60 is only capable of limited displacement, and, accordingly, the pickoffs 68 are positioned to detect axial displacements that are within the limits, to avoid frictional engagement of the rotor 60 with the center post 72 of the ball shaped core 62.

As in the prior art, suitable fluid bearings 74 are provided in the interface between rotor 60 and ball shaped core 62. Speed up and sustaining nozzles 75 can be provided, as in the embodiment of FIG. 2 above, to operate between the rotor 60 and the housing 70.

In the embodiment of FIG. 4, it is also possible to mount a frictional aligning pin in the ball shaped core 62 to engage the "inner" surface of the spherical segment or cap 64. As described above, the frictional forces created will result in the same torques on the rotor and the rotor can be aligned as described above. Such modifications are well within the scope of the present invention and may provide advantages, should it be desired to maintain all operating elements internal to the gyro housing.

Figure 5:
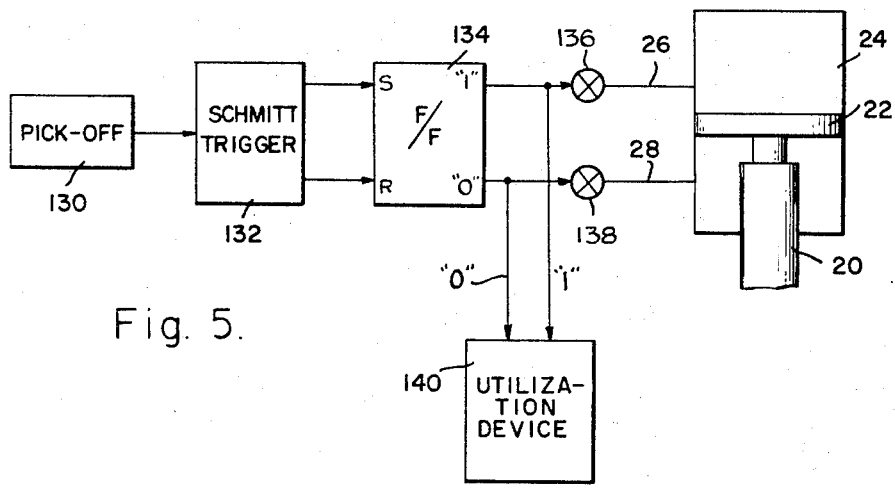
FIG. 5 is a block diagram of an incremental system for maintaining gyro alignment.

In FIG. 5 there is shown a block diagram of a suitable control system for operating a frictional aligning pin of the present invention, for example, the embodiment of FIG. 1. Shown in schematic blocks are the pickoff assembly circuits 130 which apply a signal to a suitable staticizing circuit, such as a Schmitt trigger 132. The two outputs of the Schmitt trigger 132 are respectively applied to the set and reset terminals of a flip-flop 134.

The "1" and "0" flip-flop outputs are respectively applied to a first valve 136 in the energizing fluid line 26 and a second valve 138 in the deenergizing fluid line 28. Each of the valves 136, 138 alternatively connect the chamber 24 to a source of relatively high pressure or a source of relatively low pressure. If the flip-flop 134 is in the "1" state, the first valve 136 is connected to the source of high pressure, the second valve is connected to the source of low pressure.

When the state of the flip-flop 134 changes to the "0" state, the first valve 136 is then connected to the source of relatively low pressure and the second valve 138 is connected to the source of relatively high pressure. Therefore, in the "1" state the pin 20 is brought into frictional contact with the rotor 12 and in the "0" state the rotor 12 is unrestrained.

Connected electrically to the flip-flop 134 is a utilization device 140, which may be either a digital computer circuit or any suitable circuit that enables incremental changes in axial alignment to be "remembered." Since information from a single gyro can be ambiguous, other information sensors may be necessary to correct for such potential ambiguities. For example, the pickoffs 16 of FIG. 1 can be so arranged and so interconnected that relative motion as between the XX and the AA axes, can be denominated as either a positive or negative axial change. This information, which may be coupled with gyro signals from other axes, can provide a unique determination of the scope and magnitude of axial change, in terms of direction. The utilization device 140, however, will be able to record increments of alignment magnitude, suitably modified by sign.

In one example, if the gyro of FIG. 1 was arranged with the XX axis aligned with the longitudinal axis of a moving body, and the increment of axial displacement signaled by the pickoff, was as much as 10 degrees, then during the course of a turning maneuver, if the frictional pin was actuated nine times, a right-angle or 90° turn would be recorded. Similarly, eighteen incremental alignments would signal a complete reversal in direction and the utilization device would record that the craft was now proceeding in the opposite direction, with respect to the original heading.

In other embodiments, the utilization device could be an add-substract counter which merely stores increments of change. Accordingly, the scope of the present invention should be limited only by the claims appended hereto.

What is claimed as new is:

1. In a fluid gyroscopic device including a rotatable element having an axis of rotation and an external surface including a spherical zone of one base whose center lies on the axis of rotation, caging means for aligning the axis of rotation to be coincident with a predetermined axis of orientation comprising:
   (a) a movable pin member having a first position and a second position, said first position being adjacent the rotatable element and said second position being in point contact with the spherical zone of the rotatable element at the point where he desired axis of orientation intersects the rotatable element;
   (b) means for normally retaining said pin member in its first position; and (c) selectively actuable means for maintaining said member in its second position whereby energization of said selectively actuable means causes said pin member to engage the rotatable element for coinciding the axes of rotation and orientation.

2. In combination with a housing member containing a fluid support gyro having a rotatable body with an axis of rotation, the axis of rotation, having limited freedom of movement, means for maintaining the rotational axis in substantial coincidental alignment with a predetermined orientation axis, comprising:
  (a) a curved surface on the rotatable member polar to the axis thereof with a radium of curvature substantially coincident with the rotational axis;
  (b) caging means including a moveable pin element mounted in the housing member and arranged to contact the curved surface at a point coincident with the intersection of the predetermined rotational axis and the rotatable body;
  (c) selectively operable energizing means for normally maintaining said caging means out of contact with the rotatable body, and, in response to operating signals, for bringing said caging means into contact with the rotatable body; and
  (d) signalling means for generating first signals in response to predetermined deviations of the rotational axis from the predetermined orientation axis, said energizing means being operable in response to said first signals for operating said caging means.

3. In combination with a housing member containing a fluid supported gyro having a rotatable body with an axis of rotation, the axis of rotation having limited freedom of movement, means for maintaining the rotational axis in substantial coincidental alignment with a predetermined orientation axis, comprising:
  (a) a curved surface on the rotatable member polar to the axis thereof with a radium of curvature substantially coincident with the rotational axis;
  (b) caging means including a moveable pin element mounted in the housing member and arranged to contact the curved surface at a point coincident with the intersection of the predetermined rotational axis and the rotatable body;
  (c) selectively operable energizing means for normally maintaining said caging means out of contact with the rotatable body, and, in response to operating signals, for bringing said caging means into contact with the rotatable body;
  (d) timed signalling means for producing signals at periodic intervals, and means connecting said signalling means to said energizing means for periodically aligning the rotational axis with the predetermined orientation axis.

4. In combination with a fluid supported free rotor gyro:
  (a) pick-off means for detecting and signalling incremental deviations of the rotational axis from a predetermined desired orientation axis;
  (b) caging means including a frictional member adapted to contact the rotor surface at the intersection of the predetermined desired orientation axis with the rotor member for realigning the rotational and orientation axes into coincidence;
  (c) operating means connected to said pickoff means and said caging means for energizing said caging means in response to signals representing incremental deviations; and
  (d) signal storage means for storing and accumulating pick-off signals representing successive energizations of said caging means whereby said storing means at all times contains signals representing the net change of orientation relative to an inertial frame of reference.

5. The combination with a rotatable element having a rotational axis and a curved surface having a radius of symmetry coinciding with said rotational axis of:
  (a) caging means including a pin coaxially aligned with a predetermined, desired axis;
  (b) drift signalling means for detecting and signalling deviation of the rotatable element rotational axis from the desired axis; and
  (c) correcting means connected to said drift signalling means and said caging means for energizing said caging means in response to signals representing deviations to apply said pin into frictional engagement with said rotatable element curved surface, whereby said rotational axis is realigned with said desired axis.

References Cited

UNITED STATES PATENTS

| | | | |
|---|---|---|---|
| 2,828,629 | 4/1958 | Summers | 74—5.45 |
| 2,841,015 | 7/1958 | Saxman | 74—5.1 |
| 2,872,821 | 2/1959 | Derossi | 74—5.1 |
| 2,895,338 | 7/1959 | Simons | 74—5.12 X |
| 3,115,784 | 12/1963 | Parker | 74—5.12 |
| 3,187,588 | 6/1965 | Parker | 74—5.12 |
| 3,287,982 | 11/1966 | Hayner et al. | 74—5.12 X |
| 3,311,326 | 3/1967 | Scotto et al. | 74—5.1 X |

C. J. HUSAR, *Primary Examiner.*